United States Patent
Gauchet

[15] 3,664,528
[45] May 23, 1972

[54] EARTH-WORKING MACHINES

[72] Inventor: Yves M. Gauchet, Senlis, France

[73] Assignee: Societe Anonyme Poclain, Le Plessis-Belleville Oise, France

[22] Filed: Dec. 2, 1969

[21] Appl. No.: 881,405

[30] Foreign Application Priority Data

Dec. 4, 1968 France....................................176600

[52] U.S. Cl. ......................................................214/138 R
[51] Int. Cl. ..............................................................E02f 3/00
[58] Field of Search..........................................214/132, 138

[56] References Cited

UNITED STATES PATENTS 3,241,693   3/1966   Ströker...................................214/132

FOREIGN PATENTS OR APPLICATIONS 655,447   1/1963   Canada..................................214/138
971,028   9/1964   Great Britain.........................214/138
1,807,981   11/1967   Germany................................214/132

Primary Examiner—Robert G. Sheridan
Assistant Examiner—Jerold M. Forsberg
Attorney—Mason, Fenwick & Lawrence

[57] ABSTRACT

This invention relates to an earth-working machine comprising a platform equipped with a driver's cabin which is fast therewith and is oriented in the direction of translation of the machine, and with an operating equipment mounted to pivot, with respect to the driver's cabin, about a substantially vertical axis, said operating equipment being able to pivot at least substantially through 90°, while the axis of rotation is disposed to the side of the driver's cabin, wherein said driver's cabin is disposed at the front of the platform, while rotation locking means may render integral the operating equipment and the driver's cabin for two positions of the operating equipment moved from one to the other by a pivoting through at least 90°.

3 Claims, 3 Drawing Figures

EARTH-WORKING MACHINES

In conventional earth-working machines, the operating equipment is disposed on the axis of the machine, i.e. in front of the driver's cabin. This means poor visibility, particularly when the machine is moving, whether at the working places themselves or on roads when moving from one working place to another.

In order to obviate these drawbacks, arrangements are generally provided which are impractical, complicated and not always very efficient.

For instance, a second driver's cabin is mounted on certain machines, which is mainly used during the movements of the machine. This is expensive and obliges the driver to change cabins often, at least at the working places.

It has also been thought to provide two driving positions in the one driver's cabin, generally by pivoting the driver's seat through 180°. In this case, although the controls with which a conventional machine is provided have to be installed substantially in duplicate, the result is not automatically satisfactory as regards improving the visibility, since the driver's cabin is still disposed in a position which is often badly adapted to the maneuvers of the machine.

Finally, there is the solution of the partial or complete dismantling of the operating equipment. There is no need to emphasize the awkwardness of this operation which, for this reason, is rarely carried out.

The invention intends to obviate this state of affairs and proposes to this end an efficient and convenient arrangement by which the visibility of the machines provided therewith is advantageously increased.

The invention therefore has for its object an earth-working machine comprising a platform equipped with a driver's cabin, which is fast therewith and is oriented in the direction of translation of the machine, and with an operating equipment mounted to pivot, with respect to the driver's cabin, about a substantially vertical axis, said operating equipment being able to pivot at least substantially through 90°, while the axis of rotation is disposed to the side of the driver's cabin.

Said driver's cabin is disposed at the front of the platform, while rotation locking means may render integral the operating equipment and the driver's cabin for two positions of the operating equipment, moved from one to the other by a pivoting through at least 90°.

The axis of rotation disposed to the side of the driver's cabin is advantageously located slightly to the rear thereof.

The pivoting by which the two integrating positions of the operating equipment of the driver's cabin are moved from one to the other, is preferably substantially through 180°.

Moreover, the rotation locking means are constituted by a device with a removable spindle.

Finally, as the platform with which the driver's cabin is fast is constituted by a turret pivoting about an axis on a chassis, the pivotal axes of the turret and the operating equipment are substantially merged.

The invention will be described in greater detail with reference to the accompanying drawings, in which.

Figure 2:
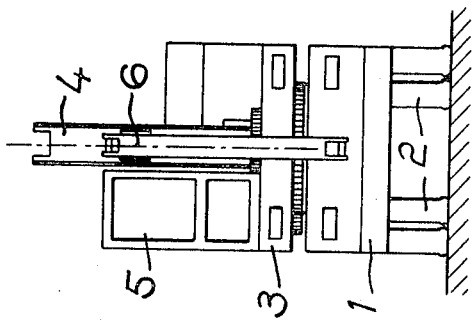
FIG. 2 is a view seen in the direction of arrow F of FIG. 1.

Referring now to the drawings, the machine according to the invention is constituted, in the embodiment chosen, by a chassis 1, equipped with rolling members, here with wheels 2. There is rotatably mounted on the chassis a platform 3 known as the turret, on which are disposed the operating equipment 4 and the driver's cabin 5.

Figure 1:
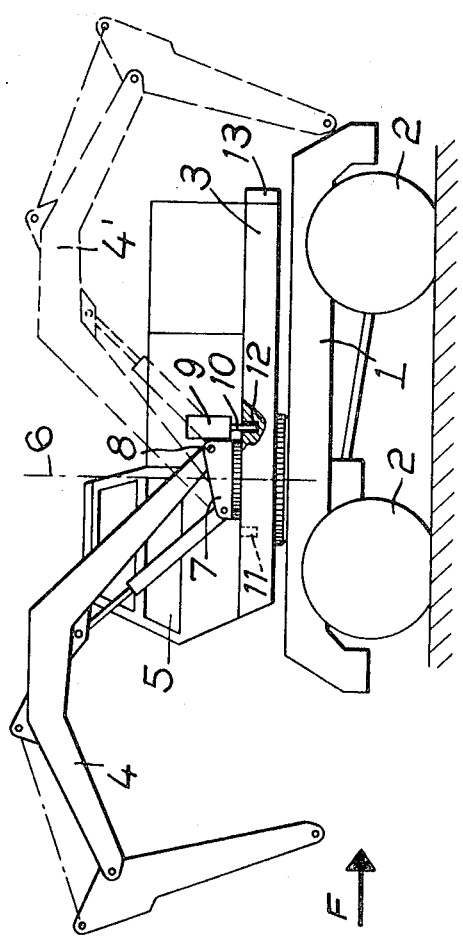
FIG. 1 is an elevational view of a machine on which is mounted an arrangement according to the invention.
Figure 3:
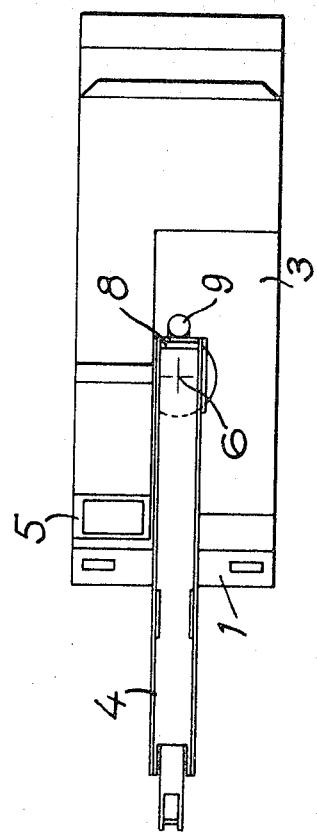
FIG. 3 is a plan view of the machine shown in FIG. 1.

The driver's cabin 5 is fixedly mounted on the platform 3 and is oriented in the direction of displacement of the machine, when the platform 3 is itself oriented so that, from the driver's cabin, one looks towards the front of the machine, as shown in FIG. 1. Moreover, it will easily be understood that the platform 3, on which is mounted the driver's cabin, is not necessarily constituted by a turret pivoting on the chassis 1 but, as a variant, may perfectly well be fixedly mounted on said chassis 1.

As for the operating equipment 4, it is mounted to rotate on the platform 3 about a vertical axis 6 located to the side of the driver's cabin 5, and preferably slightly to the rear of the said cabin. The operating equipment 4 is in fact articulated on a support 7 by a shaft 8, which support 7 is mounted to rotate on the platform 3. A hydraulic ram 9, whose body is fast with the support 7, may be controlled from the driver's cabin, whilst its rod 10 may penetrate into one of the housings 11 or 12 provided for this purpose in the platform 3 and operates as a spindle. It will be specified that the housings 11 and 12 are substantially diametrically opposite with respect to the axis 6, and at equal distance therefrom. When the rod 10 of the hydraulic ram 9 is opposite one of the two housings 11 or 12, the plane in which the operating equipment 4 may move, or the median plane, is substantially parallel to the direction in which the driver's cabin 5 is oriented. It will further be noted that the operating equipment 4 may occupy this first position 4 and a position 4', shown in solid and broken lines respectively in FIG. 1. A counterweight 13 is moreover arranged on the platform 3 at the rear of said platform.

When moving, either at the working places or on the road, the above described machine has the advantage of making it possible, very rapidly and without any dismantling to orientate the operating equipment which in no way hinders visibility, without the driver continuously having to change cabins.

When in operation at the working places, the operating equipment is generally disposed as shown at 4 in FIG. 1. It will be noted that, in this position, the equipment 4 is located to the side of the driver's cabin 5. The driver therefore has an unrestricted field of vision which enables him to see clearly and without any special effort, where the tool which he is controlling is located.

For moving on roads or at working places, it is sufficient to orientate the operating equipment so as to bring it into position 4' (FIG. 1), in order that the driver than has the whole of this equipment behind him or, to be more precise, behind and to the side of him. Forward visibility is therefore completely unrestricted. However, what is at least just as important as this improvement in the visibility is the fact that it is obtained simply, almost instantaneously. The rod 10 is disengaged from the housing 11; the support 7, therefore the operating equipment, is oriented by a means known per se (which for this reason has not been shown in the drawings); said operating equipment is brought into position 4', in which it is locked again by inserting the rod 10 into the housing 12. As the maneuver is neither difficult nor long, it is carried out efficiently by the driver who does not hesitate, since it causes no extra worry but provides on the contrary a new driving pleasure.

A secondary advantage is that maneuvers may be carried out on the rear of the platform 3 with the operating equipment itself. Therefore, with the operating equipment having been oriented previously towards the rear, and disposed at 4', it is very easy to place a heavy element, such as for example the counterweight 13, on the platform 3.

The invention is not limited to the embodiment which has just been shown, but covers on the contrary all the variants which could be made thereto without departing from the scope thereof.

What is claimed is:

1. An earth-working machine comprising, a mobile chassis, a platform pivotally mounted on the chassis for horizontal rotational movement thereon, a driver's cabin fixed to the platform and oriented in the direction of mobility of the chassis, earth-working equipment pivotally mounted on the platform at one side of the driver's cabin for movement from a position projecting forwardly of the chassis in view from the driver's cabin to a position removed therefrom through an angle of at least 90°, wherein the pivotal connections of the platform to the chassis and the earthworking equipment to the platform are coaxial, and means to lock the earth-working equipment in its extreme positions of pivotal rotation.

2. An earth-working machine as claimed in claim 1, wherein, the location of the driver's cabin on the platform is forwardly of the coaxial pivotal connections.

3. An earth-working machine as claimed in claim 2, wherein, the earth-working equipment in its forward locked position is parallel and at one side of the driver's cabin, and in its other locked position is to the rear of the machine 180° from its forward position.

* * * * *